J. GRAVES & A. W. PARTRICK.
Swinging Demijohn.
No. 211,469.   Patented Jan. 21, 1879.
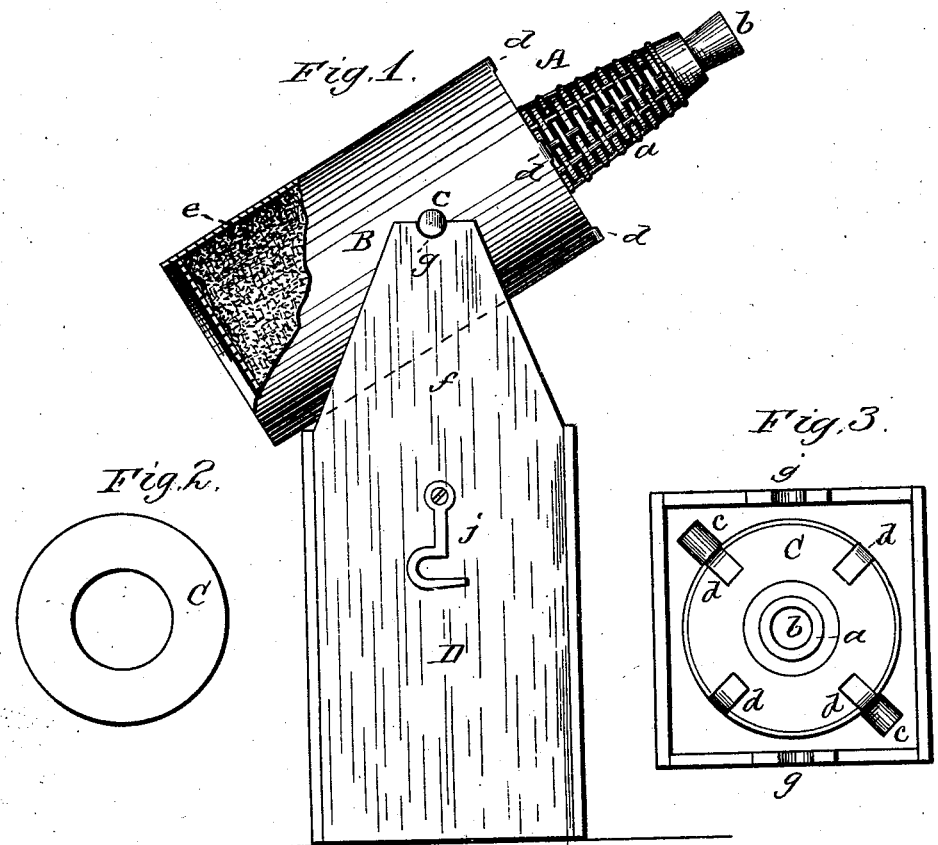
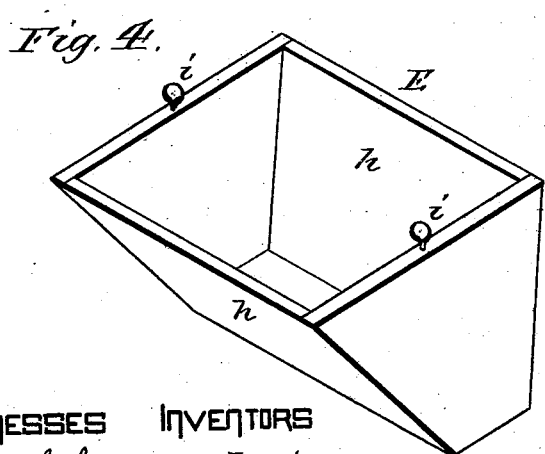
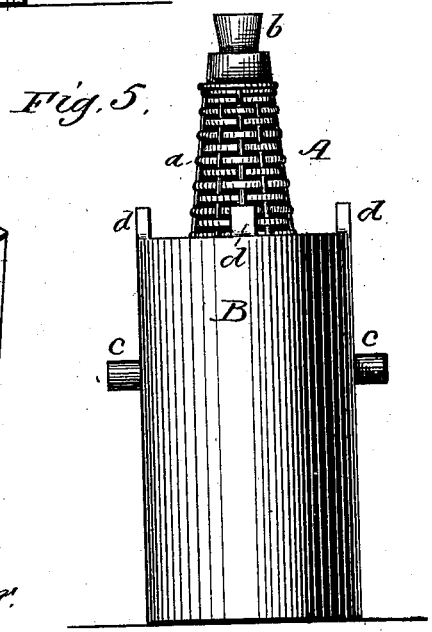
WITNESSES  INVENTORS
Nat. E. Oliphant   John Graves
Geo. R. Porter.    Alfred W. Partrick
                   per Chas. H. Fowler,
                       Attorney.

UNITED STATES PATENT OFFICE.

JOHN GRAVES AND ALFRED W. PARTRICK, OF NEW YORK, N. Y.

IMPROVEMENT IN SWINGING DEMIJOHNS.

Specification forming part of Letters Patent No. 211,469, dated January 21, 1879; application filed December 7, 1878.

*To all whom it may concern:*

Be it known that we, JOHN GRAVES and ALFRED W. PARTRICK, of New York, in the county of New York and State of New York, have invented a new and valuable Improvement in Swinging Demijohns; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of the demijohn ready for use. Fig. 2 is a plan view of the holding-ring. Fig. 3 is a top-plan view of the demijohn inclosed within the metal jacket, and the outer wooden casing, with cover removed; Fig. 4, a perspective view of the top of the outer wooden casing; Fig. 5, a side elevation of the tin casing inclosing the demijohn.

This invention has relation to that class of glass vessels inclosed within a metal jacket; and the object thereof is to so construct the metal jacket and connect or secure it around the vessel as to admit of its being readily removed therefrom and again used when required, as will be hereinafter described, and subsequently pointed out in the claim.

In the accompanying drawings, A represents a glass demijohn or other suitable glass vessel, provided with a suitable spout or neck, $a$, closed by a stopper, $b$, or any other convenient means. Placed around the vessel A is a metal jacket, B, closed at its bottom, and of sufficient height to extend up to the base of the neck $a$.

The metal jacket B is provided upon two of its sides with trunnions $c$, near the top thereof. This jacket, which may be round, square, octagonal, or other suitable shape, is formed with locking-strips $d$, which are bent over and upon a holding-ring, C, of wood or other suitable material.

Interposed between the metal casing or jacket B and vessel A is a packing of sawdust or other material, as shown at $e$, and, if desired, the vessel or jacket may be provided with a bail or handle for tilting the same. This peculiar construction of the jacket, and the manner of securing it around the vessel by the locking-strips $d$ and holding-ring C, admits of the vessel being readily removed by simply bending up the strips to a vertical position and slipping from the neck $a$ the ring C, when the vessel can be repacked at pleasure.

Should the glass vessel by any cause become broken, the liquid cannot leak out over or upon other goods while in transit, as the jacket holds the liquid and prevents it from escaping, and the jacket, not being rigidly or permanently connected to the vessel, can be used again.

The casing D, which is of wood, has two projecting sides, $f$, and at their tops semicircular or other form of bearings $g$, upon which rest the trunnions $c$ when the vessel is in use.

The casing D is of sufficient size and depth to contain the jacket and bottle when not required for use, and the casing is securely closed by a cover, E, the four sides of which are of equal depth, and the two longest sides $h$ flare outward.

The cover E has secured thereto eyes or staples $i$, and the sides of the casing D are provided with hooks $j$, by which said cover can be readily secured over said casing. Other locking devices may be employed, as found desirable.

When the demijohn or vessel A is required for use the cover E is removed, and the jacket with its vessel is elevated and placed with the trunnions upon the bearings $g$, in such position as to have the lower end of the jacket rest upon the top of one of the sides of the casing, as illustrated in Fig. 1. In this position the vessel is ready for use; and instead of being compelled to bring it from a vertical position to the required angle for drawing off the contents, a slight tipping of the vessel and jacket is all that is required, and upon releasing the hold it will, by its own weight, resume its former position.

Having now described our invention, what we claim as new, and desire to secure by Letters Patent, is—

The combination, with a suitable glass vessel, of the metal jacket B, formed with locking-strips $d$ and the holding-ring C, by which said jacket is detachably connected or secured around the vessel, substantially in the manner specified.

In testimony that we claim the above we have hereunto subscribed our names in the presence of two witnesses.

JOHN GRAVES.
ALFRED W. PARTRICK.

Witnesses:
WALTER H. WALDRON,
ABRAHAM GEIER.